April 21, 1931.  W. C. KLEIN  1,802,259
ANTIFRICTION ROLLER BEARING FREE WHEEL
Filed Sept. 5, 1929  2 Sheets-Sheet 1
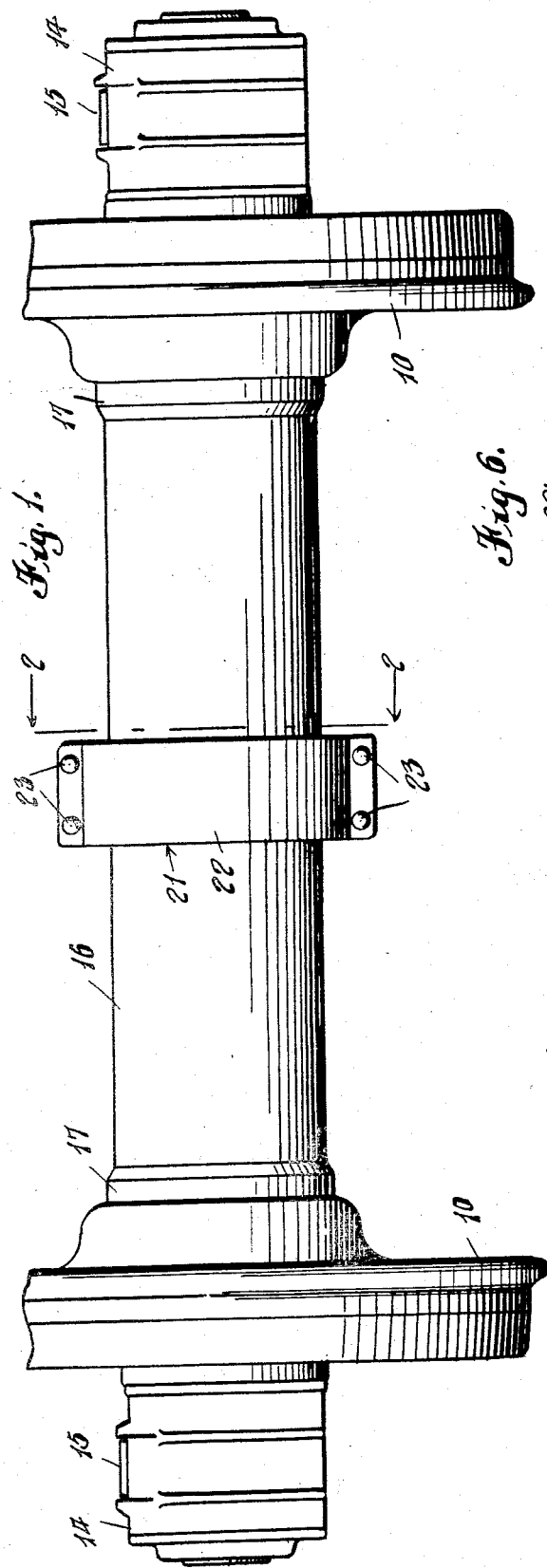
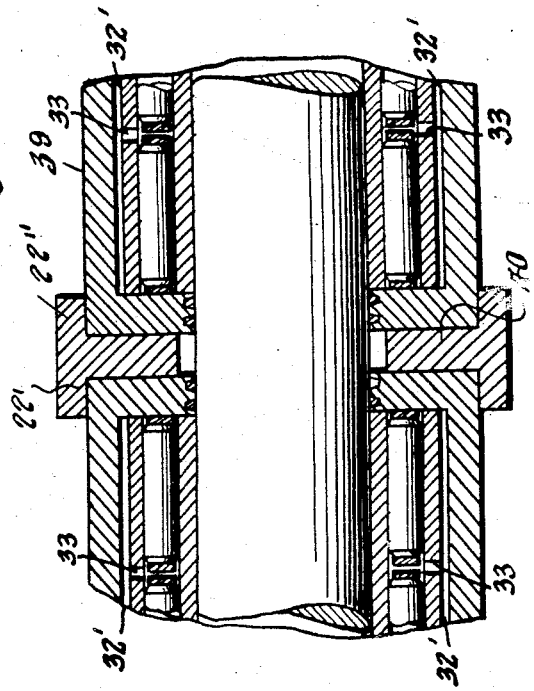
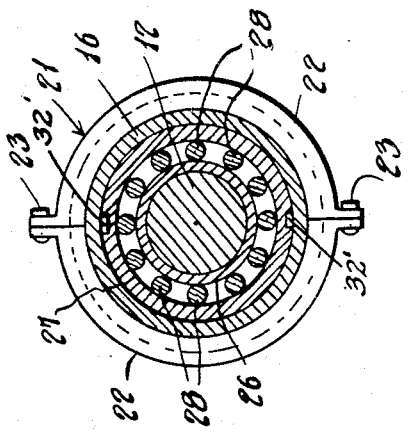
Inventor
W. C. Klein
By [signature]
Attorney

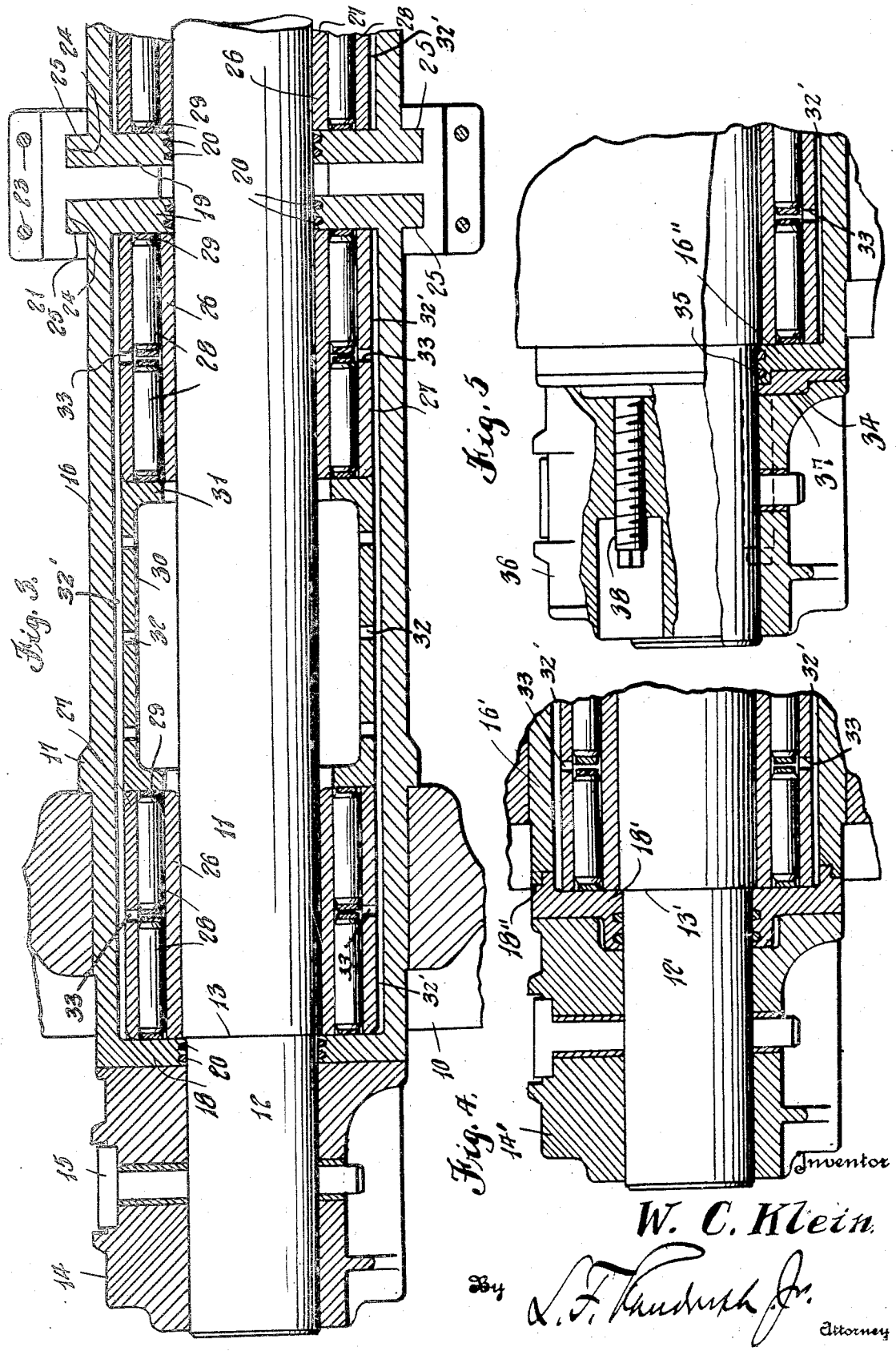

Patented Apr. 21, 1931

1,802,259

UNITED STATES PATENT OFFICE

WILLIAM C. KLEIN, OF ALLENTOWN, PENNSYLVANIA

ANTIFRICTION ROLLER BEARING FREE WHEEL

Application filed September 5, 1929. Serial No. 390,558.

This invention relates to a wheel and axle construction for railway and other cars and it aims to provide a novel construction wherein the axle is secured to the car truck against rotation and wherein the wheels shall be mounted on the axle for free rotation with respect thereto.

A further object is to provide a novel construction wherein novel roller bearing means are provided and the housings therefor extend from one wheel toward the other and terminate relatively close together and are connected in a novel manner so that the wheels may be independently removed, repaired and parts replaced.

It is further aimed to provide a novel construction of end mounting of the axle with respect to the truck pedestal.

Various additional objects and advantages will become apparent from a consideration of the description following taken in connection with accompanying drawings illustrating an operative embodiment.

In said drawings:—

Figure 1 is a view in elevation illustrating the invention in connection with an axle and pair of wheels, Figure 2 is a cross sectional view taken on the line 2—2 of Figure 1, Figure 3 is a substantially central longitudinal sectional view taken through one of the wheels and associated parts and a portion of the associated parts of the companion wheel, Figure 4 is a fragmentary view taken on the same plane as Figure 3 but through a modified form, Figure 5 is a view somewhat similar to Figure 4 but taken through a further modified form, and Figure 6 is a longitudinal sectional view showing a modified form of connection between the anti-friction bearing housings.

Referring specifically to the drawings, 10 designates conventional railway car wheels adapted for free mounting on a conventional axle 11 whose ends are reduced as at 12 providing shoulders 13. Reduced portions 12 are fastened in blocks 14 by means of pins 15, preferably removable, or otherwise.

Blocks 14 may be mounted according to any of the existing methods, that is, be slidably mounted in and for movement relatively to the pedestals of a truck or be rigidly mounted in the truck pedestal and the latter be adapted to slide and carry the same therewith. Associated with each wheel 10 is an anti-friction bearing housing 16 and the wheels 10 are rigidly connected thereto in any suitable manner as by press-fitting the same against an abutment 17 thereon. Thus the housings 16 rotate with the wheels 10 and they have terminal or end flanges 18 and 19, each flange extending inwardly and being provided with gaskets or the like 20 adapted to wipe against the axle 11 to prevent the escape of lubricant from the interior of the housings 16. The flanges 18 abut the shoulders 13.

An important feature of the present invention resides in the elongation of the housings 16 so that they substantially meet midway of the ends of the axle 11. At the meeting ends, housings 16 are connected together by a coupling ring 21 which may be made in any desired form. As shown, the ring 21 comprises a plurality of separable segmental sections 22 which are secured detachably together by means of bolts 23.

The fit between the couplings 21 and the housings 16 is loose enough to permit relative rotary movement of the housings 16 and wheels 10 as is requisite when rounding curves. It will be noted that the portions 19 are extended outwardly beyond the periphery to provide flanges 24 and that such flanges are accommodated in annular grooves 25 provided in the sections 22 of the couplings.

In each housing 16, suitable anti-friction bearing devices are provided. To this end, inner races 26 may be press-fitted tightly to the axles 11 adjacent each end of each housing 16 and they have cooperating races 27, loose or press-fitted within the housings 16. Between the races 26 and 27, anti-friction members 28 are disposed and they may be in the form of balls or rollers and the latter may be cylindrical, tapered or of any preferred form. End rings 29 are located between the races 26 and 27 and serve to properly position the bearings 28.

Between each pair of anti-friction devices, a spacing cage 30 is provided, the same having inwardly extending flanges 31 abutting the ends of the races 26 and 27 and adjacent rings 29, such cage being perforated as shown at 32 for free flow of lubricant therethrough. It will be realized that the housings 16 are filled with lubricant, and to facilitate the flow thereof, the races 27 may have ports 33 therethrough. 32' indicates conduits in the races 27 communicating with the ports 32 and 33 to permit circulation of the lubricant.

Various changes may be resorted to provided they fall within the spirit and scope of the invention. For instance one modified form is shown in Figure 4. In this form, the housing equivalent to that at 16 is designated 16' and it is closed at its outer end by a separate end plate 18', which is secured as at 18" to the housing 16' by press-fitting, bolting or in any desired manner. About the axle each portion 12', equivalent to that at 12, the end closure 18' has an annular collar or extension 13' which extends into and interfits with the block 14', equivalent to that at 14 of the preceding form.

Another modified form is illustrated in Figure 5 which may employ a plate or disk 34 interfitting with an extension 35 on the outer end wall 16" of the housing equivalent to that at 16. The block 36 is equivalent to that at 14 and 14' and it has a recess at 37 accommodating an interfitting projection or struck out portion on the disk 34. One or more screws 38 may be threaded on the block 36 and are adapted to be moved against the plate 34 in order to impart longitudinal movement to the housing 16 and wheel carried thereby to properly and adjustably position the same.

Referring to the further modified form shown in Figure 6, a sectional coupling 22' is employed in lieu of that at 22, its parts being of T-shape in cross section so as to have a flange 22" overlapping the peripheries of housings 39 equivalent to those at 16 but devoid of the flanges 25. This particular form also provides a flange or web at 40 which is disposed intermediate the ends of the housings 39.

It will be obvious that the screws 38 may be employed in each of the preceding forms and abut directly against the housings and that such forms can be considered as employing such screws, since the section lines are taken at locations where the screws do not appear.

I claim as my invention:—

1. In combination, a relatively fixed axle, a plurality of wheels, said wheels having housings thereon, means joining the housings and permitting relative movement thereof, and anti-friction means adjacent both ends of each housing and between the housings and said axle.

2. In combination, a relatively fixed axle, a plurality of wheels, said wheels having housings thereon, means coupling the housings and permitting relative movement thereof, anti-friction means adjacent both ends of each housing and between the housings and said axle, said coupling means and housings have interfitting parts.

3. In combination, a relatively fixed axle, a plurality of wheels, said wheels having housings thereon, means coupling the housings and permitting relative movement thereof, anti-friction means between the housings and said axle, said coupling means and housings having interfitting parts, said axle having shoulders adjacent the ends thereof, and said housings being in abutting relation with said shoulders.

4. In combination, a relatively fixed axle, a plurality of wheels, said wheels having housings thereon, means coupling the housings and permitting relative movement thereof, anti-friction means between the housings and said axle, said anti-friction means comprising bearing devices adjacent the ends of the housings and a spacing cage intermediate the same.

5. In combination, a relatively fixed axle, a plurality of wheels, said wheels having housings thereon, means coupling the housings and permitting relative movement thereof, anti-friction means between the housings and said axle, said housings having integral inwardly extending end walls directly engaging the axle, said housings also having outwardly extending flanges adjacent their inner ends in interfitting relation with said coupling means.

6. In combination, a relatively fixed axle, a plurality of wheels, said wheels having housings thereon, means coupling the housings and permitting relative movement thereof, anti-friction means between the housings and said axle adjacent each end of each housing, said coupling means being in separable sections.

In testimony whereof I affix my signature.

WILLIAM C. KLEIN.